United States Patent [19]
Cole

[11] Patent Number: 5,015,844
[45] Date of Patent: May 14, 1991

[54] OPTICAL SURVEILLANCE SENSOR APPARATUS

[75] Inventor: Eugene O. Cole, Albuquerque, N. Mex.

[73] Assignee: The United States of America as represented by the Secretary of the Air Force, Washington, D.C.

[21] Appl. No.: 312,533

[22] Filed: Feb. 17, 1989

[51] Int. Cl.⁵ .............................. G01B 11/26
[52] U.S. Cl. .................. 250/227.24; 350/96.29
[58] Field of Search ............... 250/227, 227.24; 350/96.24, 96.26, 96.29

[56] References Cited

U.S. PATENT DOCUMENTS

| | | | |
|---|---|---|---|
| 4,178,101 | 12/1979 | Booth | 250/227 |
| 4,465,940 | 8/1984 | Graff et al. | 250/578 |
| 4,585,937 | 4/1986 | Schneider | 250/227 |
| 4,585,948 | 4/1986 | Schneider et al. | 250/578 |
| 4,625,108 | 11/1986 | Nestel et al. | 250/227 |
| 4,630,902 | 12/1986 | Mochizuki et al. | 350/570 |
| 4,650,279 | 3/1987 | Magee | 350/96.24 |
| 4,674,874 | 6/1987 | Halldorsson et al. | 250/227 |
| 4,703,168 | 10/1987 | Olson | 250/207 |
| 4,835,381 | 5/1989 | Sorensen | 250/227 |

Primary Examiner—David C. Nelms
Assistant Examiner—George Beck
Attorney, Agent, or Firm—William Stepanishen; Donald J. Singer

[57] ABSTRACT

An optical sensor apparatus having one or more optical fibers with a numerical aperture of 0.870 or less to receive and conduct light signals. A light detecting unit receiving the light signals from said optical fibers and providing an electrical output signal in response thereto. A signal processing unit receiving the electrical output signal and determining the signal distribution thereof.

18 Claims, 6 Drawing Sheets

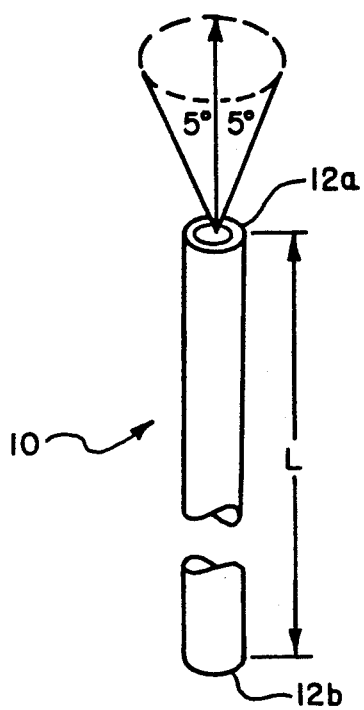
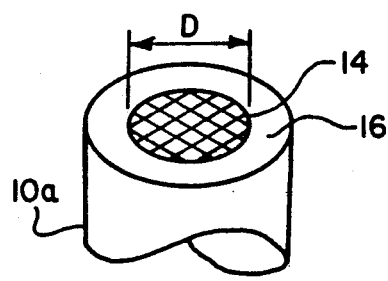
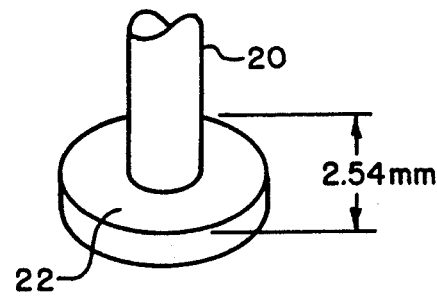
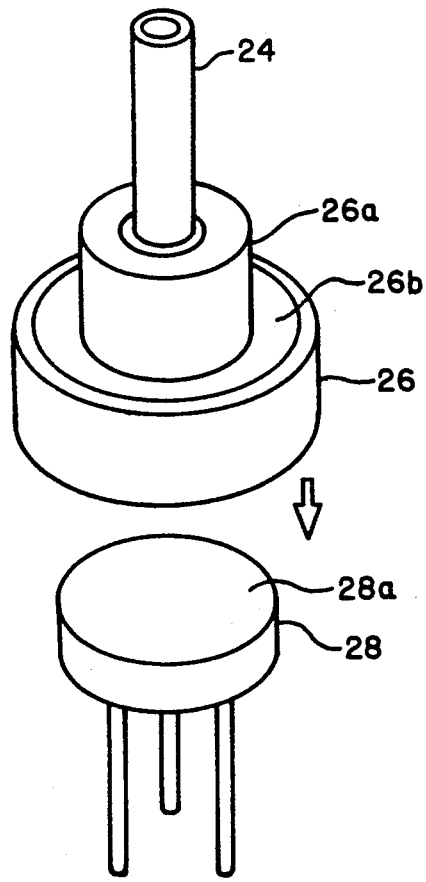
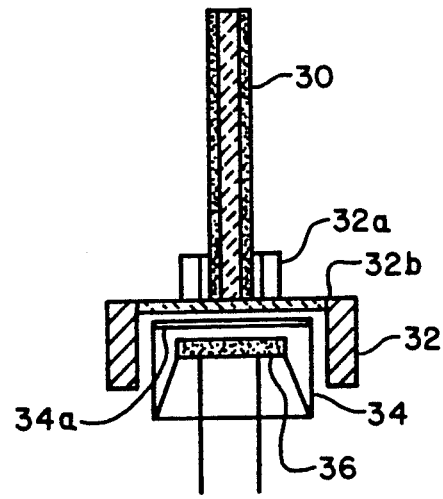
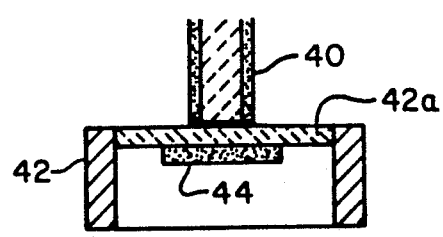
FIG. 1a
FIG. 1b
FIG. 2
FIG. 3
FIG. 4a
FIG. 4b

OPTICAL SURVEILLANCE SENSOR APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to a surveillance sensor, and in particular to an optical surveillance sensor, a microprocessor-controlled RF apparatus having a compound eye configuration.

The state of the art of optical sensors is well represented and alleviated to some degree by the prior art apparatus and approaches which are contained in the following U.S. Patents:

U.S. Pat. No. 4,465,940 issued to Graff et al. on Apr. 29, 1986;

U.S. Pat. No. 4,585,937 issued to Schneider on Apr. 29, 1986;

U.S. Pat. No. 4,585,948 issued to Schneider et al. on Apr. 29, 1986;

U.S. Pat. No. 4,630,902 issued to Mochizuhi et al. on Dec. 23, 1986;

U.S. Pat. No. 4,650,279 issued to Magee on Mar. 17, 1987; and

U.S. Pat. No. 4,703,168 issued to Olson on Oct. 27, 1987.

The Graff patent is directed to an electro-optical target detection apparatus which utilizes a signal processing circuit for combining data from several spectral bands to enhance the signal-to-background ratio of a target detection system. Two spectral bands, with separate sensing arrays, receive analog signals which are fed to separate multiplexer units. From the multiplexers, the analog signals are applied to a comparator where they are compared with each other and also separately applied to shift registers where the signals are retained for further processing. If, during comparison, the ratio of the two bands is less than a threshold, there is an absence of cloud return and the signals stored in both shift registers are combined in a final output register. If the ratio of the two bands is more than a threshold, the band having the most cloud return is not used and the shift register containing the greater percentage of target return is processed through the output register.

The Schneider patent relates to a high efficiency fiber-shaped detector having a longitudinally extending core transparent to the wavelength of an incoming beam of electromagnetic radiation. Circumscribing the core and deposited thereon is an extremely thin layer of photosensitive material, an extremely thin layer of insulation and an extremely thin layer of reflective material. The photosensitive layer converts the electromagnetic radiation into an electrical signal which is transmitted to a processing system. Upon receiving the incoming beam of electromagnetic radiation, the reflective layer reflects this beam so that the beam passes through the photosensitive layer many times.

The Schneider et al. patent describes a non-scanning integrated optical system with wide field of view-search capabilities that is realized without scanning or moving parts by means of an integrated multiaperture optical system. The system utilizes light gathering optics in the form of an array of eyelets or lens apertures that direct in-coming light onto a detector layer. The detection layer consists of individual detectors, more than one to a lens. Under the detector layer there is a correlation layer, which contains a memory cell for each detector and circuitry which connects to neighboring memory cells according to a hard wired program. Below the correlation layer is a processing layer which contains microprocessor circuitry allowing further processing of the acquired information.

The Mochizuki et al. patent discloses a compound eye optical system having a variable magnification function including a first imaging element array having a plurality of imaging elements of the same focal length at an equal pitch, a second imaging element array having a plurality of imaging elements of the same focal length arranged at a pitch different from that of the first imaging element array, the second imaging element array disposed more adjacent to the image side than the first imaging element array, and means for varying the imaging magnification of a composite optical system comprising the first and second imaging element arrays.

The Magee patent teaches a fiber optic lens which includes an input aperture and a fiber optic array interconnecting the input and output apertures, including multiplicity of single mode fiber optic elements of equal optical path length for transmitting light rays in-phase from the input aperture to the output aperture; the fiber optic elements are interconnected at the same relative location at each aperture for receiving the wave front at the input aperture and producing an image at the focal point of the output aperture and having a diffraction limit which is a function of the diameter of the entire fiber optic array.

The Olson patent relates to a two-dimensional energy position detector which includes an array of wedge-shaped anodes arranged in an alternating sequence. Each of the anodes is connected to a multiplexer which is controlled by a sequencer to place the signals from the anodes in a predetermined sequence onto a multiplex output line. A data processor may then analyze the signal on the multiplex output line to determine the position of energy incident on the anodes.

In the prior art, it is clear that a need exists to provide a lightweight and comprehensive sensor system which can provide a coverage of 2 pi steradians, and can be made very inexpensively. A sensor system which does not involve any large moving parts or optic devices, can satisfy that need. In addition, there exists a need for a sensor system that can detect targets which are 90 degrees off the central optical axis and which through signal processing (sequential signal processing) can vector the sensor system such that the central optical axis is coincident with the primary target image. A sensor system with the potential for combining both radar and optical sensors by means of signal processing, can benefit from the detected and different energy spectrums from a given target. The inherent EMI immunity of a sensor system utilizing optical fibers, will provide the means to channel detected photons (UV-visible-IR) around a radar antenna to the required detector units.

The present optical surveillance apparatus may be utilized in a stationary surveillance mode wherein a sensor configuration which provides 2 pi steradians coverage (or more) could have an image template (in memory) of its static background FOV and then compare image at predetermined time intervals for any changes. The rate at which the sensor looks or compares its instantaneous FOV with that in the template memory will depend upon the particular application and the field of view conditions.

For high speed applications, a sensor mounted on a high speed platform could be designed to detect targets 90 degrees or more off its velocity vector and through internal software handoffs align the velocity vector to the primary detected object image. This high speed application could also be used to control the direction of a movable platform (fixed ground position) to track the motion of a detected target.

A survivable sensor system may be established by a sensor which uses high temperature materials and combining the inherent EMI immunity of optical fibers, the elimination of large single piece optics and moving parts, results in a sensor system that is robust and survivable for both earth and space based systems where incident light may have higher power deposition (watts/cm2).

SUMMARY OF THE INVENTION

The present invention utilizes an optical sensor which is modeled on the compound eye (ommatidium) of an insect and is a plurality of optical fibers, detectors (discrete or arrays) and associated signal processing to deter and determine the location, relative location, apparent motion, direction, centroid event, and/or other variables of a given target. Each optical fiber, representing an input channel, is connected to a discrete detector or assigned number of pixels on an array such that a 1:1 mapping occurs between input photons and the assigned detector elements. The optical fibers are selected for optimum match with the emission spectrum of a given target to transmit the desired wavelengths (UV, visible, IR).

The numerical aperature (N.A.) of the fibers are selected to produce different field of view (FOV) results which range from very small FOVs (1 degree full angle or smaller) to larger FOVs as required to provide sufficient overlapping coverage at a predetermined range. Overlapping coverage is a function of the number of optical fibers to be used and the FOVs of each optical fiber. External shape of the sensor can be similar to a hemisphere or even a flat surface depending on the application of the sensor. The principal concern is to design a total sensor that provides sufficient detector units per unit area for the required solid angle coverage of a given application.

The processing of signals from the optical surveillance sensor apparatus will be dependent upon the particular application. The selected choice of signal processing may be neural networking similar to biological sensor systems in insects or a sequential signal processing system may be utilized. The external functions of such signal processing would be to provide handoffs, trajectory prediction, centroid location, etc. The optical surveillance sensor apparatus may be utilized in high speed data acquisition system that does not use parallel processing but sufficiently fast to accept and process the variety of signal inputs (i.e., IR, UV, visible) it may receive.

It is one object of the present invention to provide an improved optical surveillance sensor apparatus.

It is another object of the invention to provide an improved optical surveillance sensor apparatus wherein selected optical fibers have numerical apertures of 0.0875 and smaller.

It is another object of the invention to provide an improved optical surveillance sensor apparatus wherein the smaller the average overall field of view, the greater the resolution of the sensor system.

It is another object of the invention to provide an improved optical surveillance sensor apparatus in which each optical fiber and its associated detector are selected for a given wavelength.

It is another object of the invention to prove an improved optical surveillance sensor apparatus which utilizes detectors of differing wavelength sensitivity to prove a broadband sensor which detects targets across the UV, visible and IR spectrums.

It is another object of the invention to provide an improved optical surveillance sensor apparatus wherein the sensor has a hemispherical configuration to provide overlapping coverage for complete sector coverage of 2 pi steradians.

It is another object of the invention to provide an improved optical surveillance sensor apparatus wherein the optical image input signals are processed in parallel to determine selected parameters on detected targets.

It is another object of the invention to provide an improved optical surveillance sensor apparatus which is very cost effective and light weight for both stationary and moving system applications.

These and other advantages, objects and features of the invention will become more apparent after considering the following description taken in conjunction with the illustrative embodiment in the accompanying drawings.

BRIEF DESCRIPTION OF THE DRAWINGS

FIG. 1a is a broken pictorial view of a single optic fiber of the type utilized in the present invention;

FIG. 1b is an enlarged segmented pictorial view of one end of the single optic fiber;

FIG. 2 is a segmented pictorial view of the optic fiber mated to a detector unit;

FIG. 3 is a pictorial view of an optic fiber in a mount for mating with a TO-5 mounted detector;

FIGS. 4a and 4b are cross-sectional views, respectively, of alternate mounting methods;

DESCRIPTION OF THE PREFERRED EMBODIMENT

Figure 5:
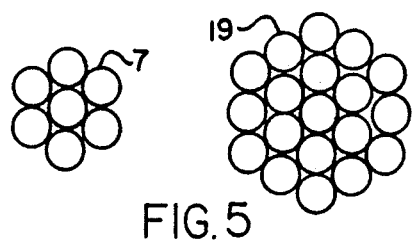
FIG. 5 is a pictorial comparison of 19 close hex-packed optic fibers with 7 close hex-packed optic fibers.

Referring now to FIG. 1a, there is shown a single optical fiber 10 which may comprise one of the many optical fibers that are utilized in present optical surveillance sensor apparatus. As will be discussed later, a predetermined number of optical fibers will be closely packed or mounted in a spherical surface to provide an optical sensor. The optical fibers which will be utilized for the present apparatus, are multi-mode optical fibers. Optical fibers of the type utilized in the optical sensor will have the following characteristics.

In FIG. 1b, there is shown an enlarged sectional view of the optical fiber 10 of FIG. 1a. The optical fiber 10a has a core diameter, D, which is substantially in the range of 1 to 3 millimeters. For the present example, the optical fiber 10a, as shown in FIG. 1b, will have a core diameter of one millimeter and the cladding 16 may be by any suitable commercially available method and material that is known in the art. While the optical fiber 10 has a numerical aperture approximately equal to 0.871, it should be well understood that optical fibers for the present apparatus may have numerical apertures (N.A.) of approximately 0.875 and smaller. The use of an optical fiber with a numerical aperture of 0.871 will provide a field of view (FOV) of approximately 10 degrees. The field of view of 10 degrees is shown in FIG. 1a as the solid core which is achieved by the revolution of the cone half angle of 5 degrees. The front surface 12a of the optical fiber is cleaved and polished. The back surface 12b is also cleaved and polished. Depending upon the particular application, optical fibers may be chosen for their transmission capabilities in a spectrum of interest, such as, for example, the visible, infrared or ultraviolet spectrums, and desired length, L.

Turning now to FIG. 2, there is shown a pictorial representation showing an optic fiber 20 in relation to the active area of a detector 22. The active area of the detector 22 should be greater than the core area of the optic fiber 20. The core area of the optic fiber 20 which is one millimeter in diameter is centered on the active area of the detector 22 which has a diameter of 2.54 millimeters. A detector with a diameter of 2.54 millimeter will have an active area of 5.1 square millimeters. A TO-5 canister will readily accept an optical detector with a diameter of 2.54 millimeters. In addition to the requirement that the active area of the detector be greater than the area of the optic fiber core, the detector must have a fast rise time for good high frequency response, a flat mounting surface and fit in a TO-5 canister. Two such devices are the EG and G units FND-100 and HFD-1060. The FND-100 operates in the photo conductive mode only, while the HFD-1060 is a combined detector and operational amplifier.

There is shown in FIG. 3a a pictorial representation of an optic fiber 24 in a mounting unit 26. The optic fiber 24 which has a one millimeter core and a numerical aperture of approximately 0.087 to provide a field of view of approximately 10 degrees, has a polished top surface to receive light signals. The other end of the optic fiber 24 is attached to a plastic or metal mount 26 which is dimensioned to mate with a TO-5 mounted detector. The optic fiber 24 may be epoxied or otherwise suitably attached to the collar portion of the mount 26. The bottom surface of the optic fiber 24 which is flat and polished, is positioned directly on the light transmitting surface 26b of the mount 26. This mounting configuration of the optical fiber in relation to the detector, comprises a non-imaging optic system. The active area detector is positioned or attached beneath the window 28a of the TO-5 canister unit 28. The TO-5 canister may house or enclose a detector array of pixels that resolves the intensity profiles at the output of a given fiber optic channel.

FIGS. 4a and 4b are cross-sectional views, respectively, of an optic fiber which is mated to a mount to accept a TO-5 canister unit or a mounting unit containing the active area of a detector. In FIG. 4a, an optic fiber 30 is either epoxied, glued or otherwise held in the mount collar portion 32a which is attached to the mount window 32b. The bottom surface of the optic fiber 24 is held adjacent to the mount window 32b. The TO-5 canister unit 34 which contains the detector material 36 may be attached to the mounting unit 32 by suitable commercially-available means. The relationships between the various elements (the optic fiber 30, the windows 32b, 34a and detector material 36) are clearly shown. In FIG. 4b, there is shown a cross-sectional view of an alternative embodiment for the optical sensor apparatus. In the embodiment, the optical fiber 40 is directly attached to the window 42a which is part of the mounting unit 42. The mounting unit 42 may comprise any suitable commercially available material, such as metal, plastic or ceramic etc. The detector unit 44 which is attached to the window 42a may comprise a CCD array or any other two dimensional array of photodetectors for the wavelength of interest. The optic fiber may be indirectly attached to the detector, as shown, or may be directly attached to the detector. Any suitable commercially available epoxy or adhesive material may be utilized to attach the components.

For the purposes of evaluation, a closely packed hex configuration of nineteen optic fibers was chosen since the configuration represents the second complete hex-—close packing configuration after 7 elements.

A sensor with 19 detector units which are arranged in a close hex-packing configuration will provide sufficient information on the capability of this sensor apparatus to evaluate its performance, whether on this side or a much larger one.

Figure 6:
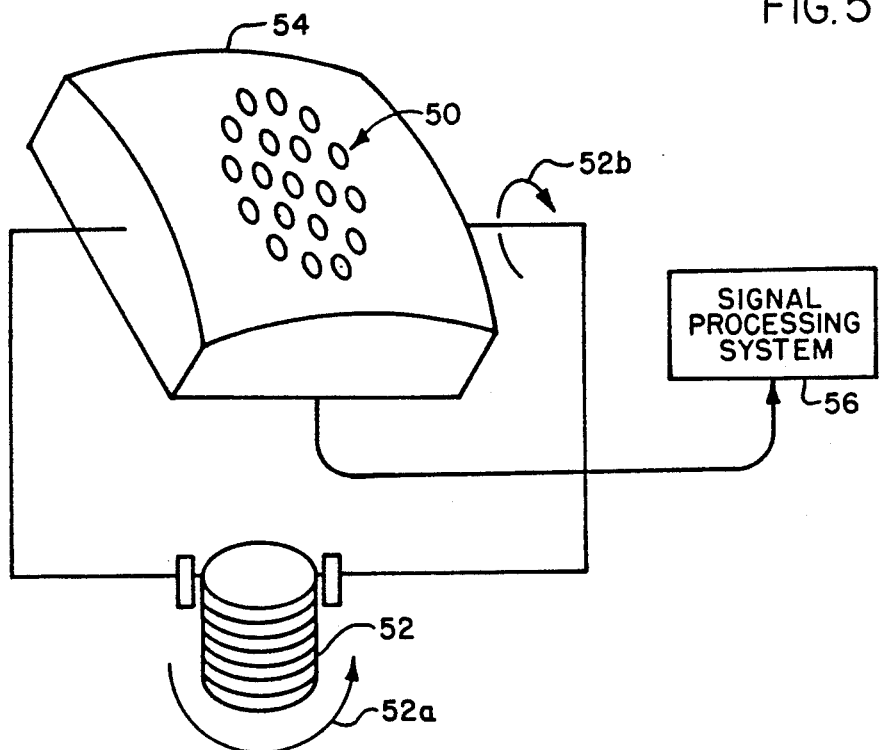
FIG. 6a is a pictorial/schematic view of an optical sensor apparatus arranged on a spherical surface.

In FIG. 6 there is shown an optical surveillance sensor apparatus in its simplest form. An array of nineteen optical fibers 50 which are arranged in a closely-packed hex configuration, are mounted in a spherical mounting structure 54. A two-axis gimballed system 52 which provides two axes of rotation 52a, 52b is operatively connected to the spherical mounting structure 54. The two-axis gimballed system 52 provides a sufficient total scan range of the sensor to cover a wide surveillance area or to permit laboratory testing and calibration wherein it is easier to steer the sensor mount than to move a test laser/light source. The output signals which are obtained from the optical fibers 50 are applied to a signal processing system 56. The signal processing system 56 may comprise any suitable commercially-available signal processing system and may utilize either a sequential or parallel processing. The choice of sequential, parallel or a combination thereof processing will vary and depend upon the particular application of the optical sensor apparatus.

Figure 7A:
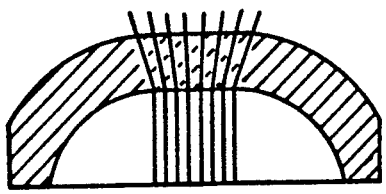
FIGS. 7a and 7b are cross-sectional views, respectively, to show in greater detail the mounting and relationships of the optic fibers in a spherical mounting block.

In FIG. 7a, there is shown a cross-sectional view of the spherical mounting structure of FIG. 6. The optical fibers are placed in holes in the spherical mounting structure which are drilled with a common center, i.e., each hole in the spherical mounting structure is a radial line from a common center point.

Figure 7B:
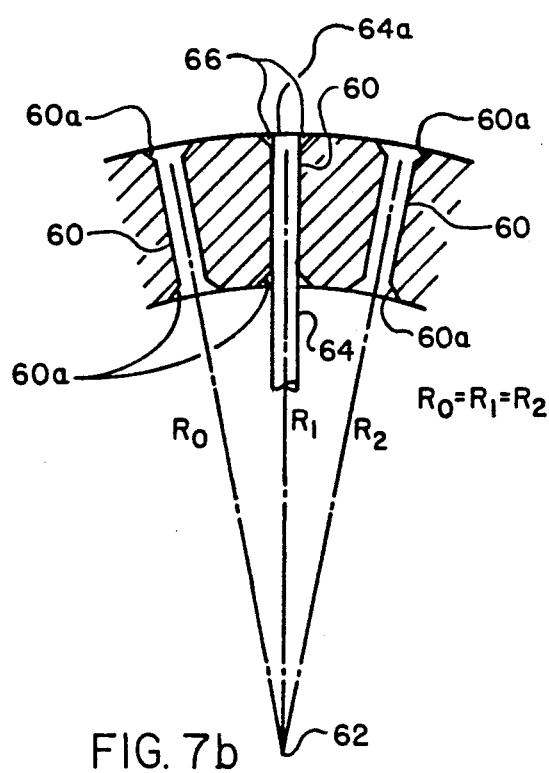

In FIG. 7b, there is shown in greater detail in a partial cross-section of the spherical mounting structure of FIG. 6 the radially-aligned holes 60. These holes 60 have a common center point 62 and radii $R_0$, $R_1$ and $R_2$ in which $R_0 = R_1 = R_2$. Each of the holes 60 may have a chamfer 60a at the inner and outer surfaces respectively. In addition, each optic fiber 64 (a single fiber is shown for clarity) may be attached to the spherical mounting block by epoxy 66. The front surface 64a of the optic fiber 64 will be positioned to be flush with the outer surface of the spherical mounting block.

For each sensor configuration and characteristics (numerical aperture etc.) there will be a given range (distance from sensor) wherein the adjacent fiber optic/detector units will acquire the same information or target. It is desire that this over-lapping coverage is just sufficient to meet the demands of the sensor apparatus application. The factors that determine this overlapping coverage are:

(1) the radius of mounting block,
(2) the number of detector units and how close they are mounted (how close holes in block are),
(3) the numerical Aperture (which determines FOV for each detector unit, and,
(4) the range (distance to target).

Figure 8:
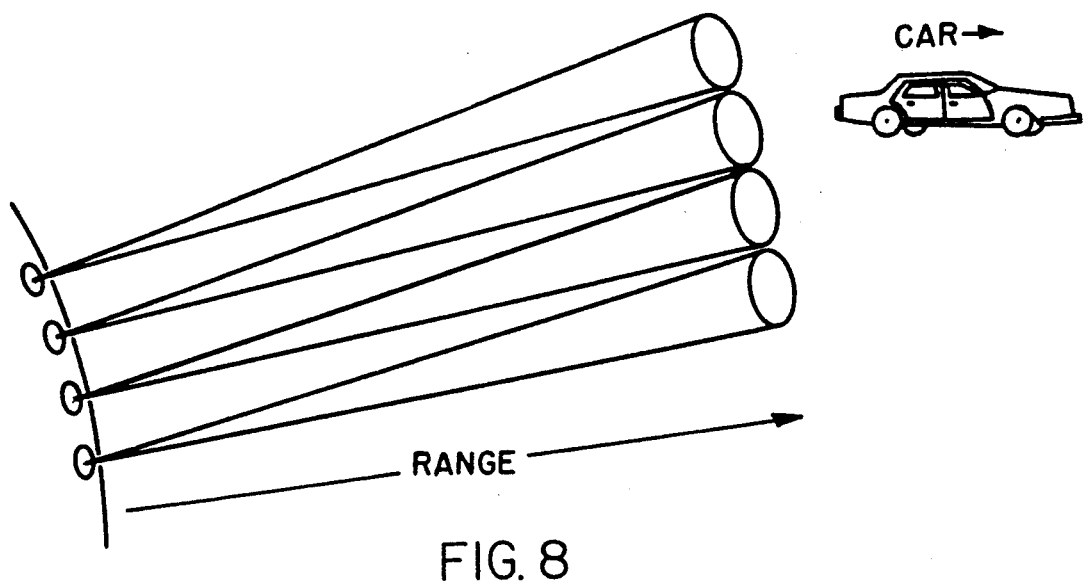
FIG. 8 is a schematic diagram of the overlapping coverage of an optical sensor apparatus.

In FIG. 8, there is shown a pictorial diagram of an optical surveillance sensor apparatus wherein optical fibers with a common address are mounted in a line or a single column on a spherical surface. In this example, all the fibers have the same numerical aperture and for the spacing between the fibers, will establish a range at which the adjacent cones will come in contact with each other. Beyond this contact range there will result overlapping coverage. The field of view of each detector unit which is related to the numerical aperture of the optical fiber also determines the range to a target (for this example, a car) and the overlapping coverage.

Figure 9A:
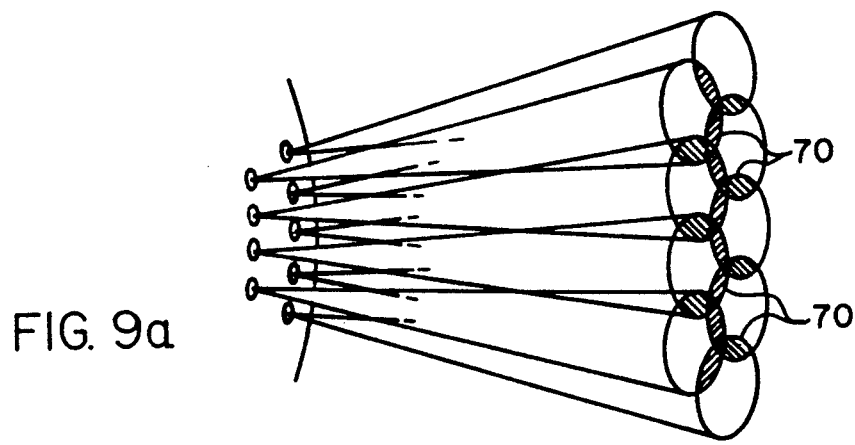
FIGS. 9a and 9b are schematic diagrams, respectively, illustrating sensor configuration for overlapping coverage, and, blind spots between field of view cones.

In FIG. 9, there is shown an example of overlapping coverage by adjacent columns of optical fibers which are mounted on a spherical surface. All of the optical fibers have the same numerical aperture and therefore the same field of view. The field of view of each optical fiber comprises a cone configuration. The range to the point of overlap is determined by the spacing between and the alignment of the optical fibers in their respective columns or rows. It should be well understood that the orientation of the optical fibers on whatever surface they may be mounted, is fully dependent upon the physical characteristics of the desired optical surveillance application. In the present example, the overlap 70 occurs in the areas where the field of view cones intersect each other. It is necessary to determine the primary function for each sensor application an then use the appropriate fibers/detector units and mounting surface to meet the requirements for a given sensor apparatus.

Figure 9B:
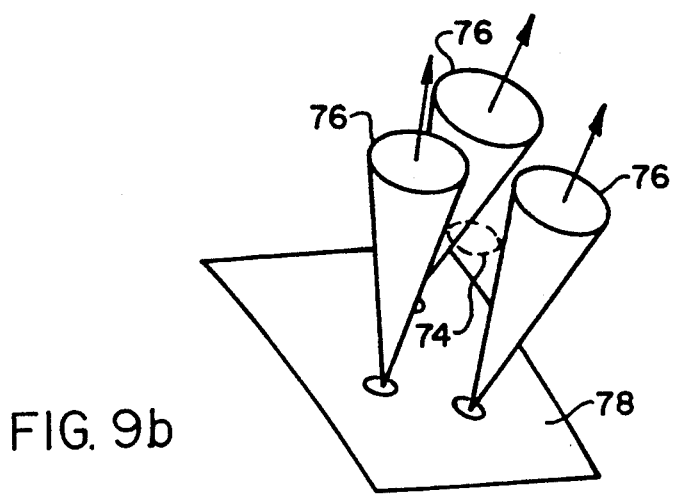

In FIG. 9b, there is shown a schematic diagram of a three optical fiber configuration which illustrates the problem of created blind spots. The volume region 74 between the projected field of view cones 76 represents a blind spot. This blind spot clearly varies with range from the point of overlap to the surface of the mounting structure 78. Various methods can be used to insure that no targets can be found in blind spots. These method involve:

NA of Fibers
Number of Detector Units/Surface Area
Selection of different fibers (Different FOVs).

It is always a compromise between Overlapping cover and potential blind spots. The design considerations of each sensor using:

N.A. (FOV) of each fiber.
Number of Detector/Surface Area
Mounting Surface whether hemisphere, flat surface, or other.

Figure 10:
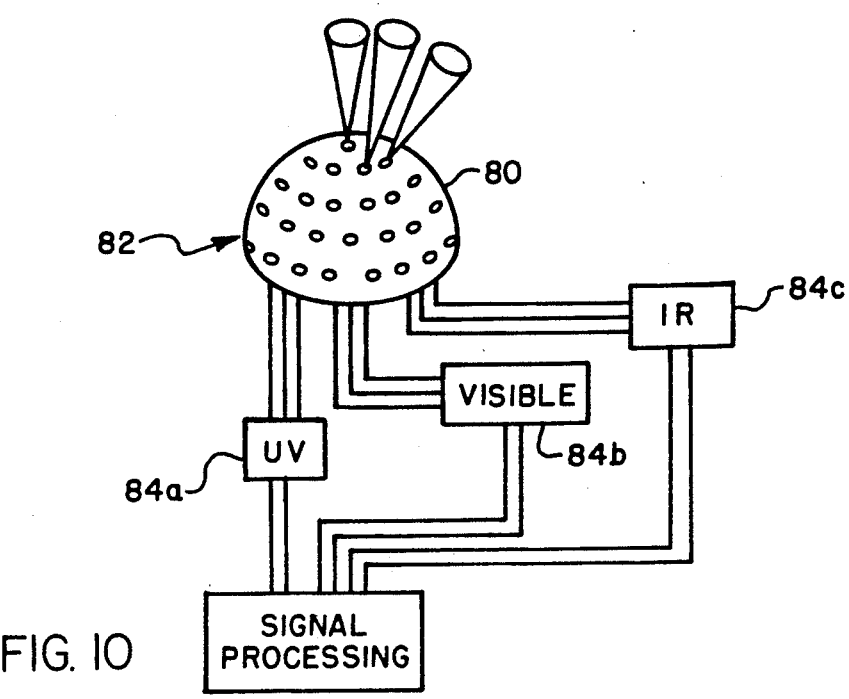
FIG. 10 is a block diagram of a 2 pi steradian optical surveillance sensor apparatus for the IR to UV spectrum.
Figure 10A:
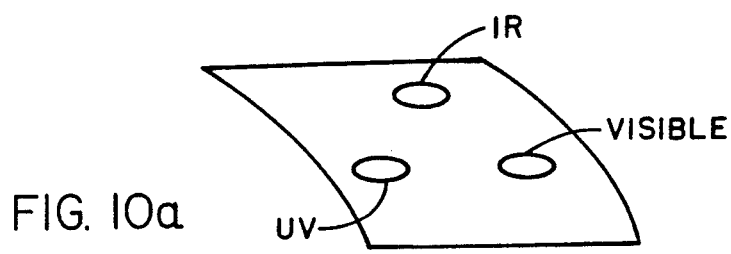
FIG. 10a is an enlarged partial sectional view of optic fiber configuration for three wavelengths of interest.

Turning now to FIG. 10, there is shown a block diagram for an optical surveillance sensor apparatus which has a coverage of 2 pi steradians and utilize multiple wavelength detector units 84a, 84b and 84c. A hemispherical mounting structure 80 has mounted therein a plurality of optical fibers 82 which operate in a specific wavelength and are connected to the appropriate detector unit 84a, 84b or 84c. The output signals from the detector units 84a, 84b and 84c are applied to the signal processing unit 86 for processing. FIG. 10a is an enlarged partial sectional view of an optical fiber configuration for the wavelengths of interest in FIG. 10 wherein each unit cell has one of the detector types (UV, IR, visible). The optical surveillance sensor apparatus may be utilized for a number of applications such as, for example, (a) surveillance—could look for bright lights and indicate their position, (b) intrusion—signal processing could compare "static background image" and compare with instantaneous (sample rate) images to look for intruders.

Figure 11:
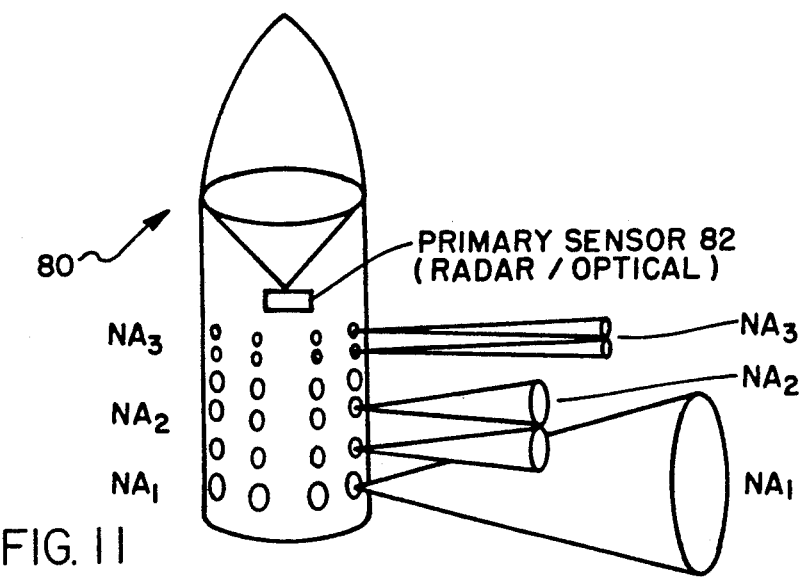
FIG. 11 is a schematic representation of a combination radar/optical sensor apparatus.

A further example of sensor application is shown pictorially in FIG. 11. There is shown a projectile 80 with a primary and secondary sensor system. The primary system comprises a radar/optical sensing unit 82 which is mounted in the nose of the projectile 80. The secondary sensor system comprises optical fiber/detector units which are operatively connected to and around the base of the projectile 80. The front fiber surface of the optical fibers are mounted flush with the cylindrical surface of projectile. The optical fibers are selected to have three or more predetermined NAs (∴FOVs) such that NA 1 > NA 2 > NA 3 etc., where higher resolution is achieved in detectors closer to primary sensor system. The objective of this sensor arrangement is to acquire a target 90 degrees or more away from initial velocity vector and through a relatively inexpensive sensor design and configuration. In FIGS. 11a through 11d there is shown an acquisition sequence for such a projectile/sensor system. Vector projectile such that it's primary sensor acquires a given target. The secondary sensor system initially acquires the target and tracks it until the velocity vector of the projectile and primary sensor system are sufficiently aligned to lock-on to the target.

Figure 11A:
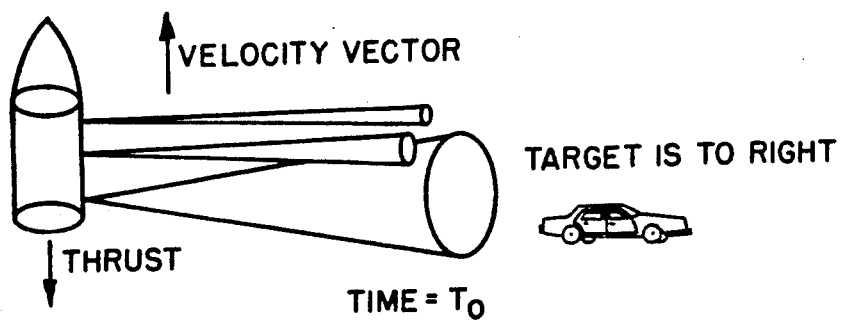
FIGS. 11a–11d are schematic representations of the projectile sensor apparatus in various stages of operation.
Figure 11B:
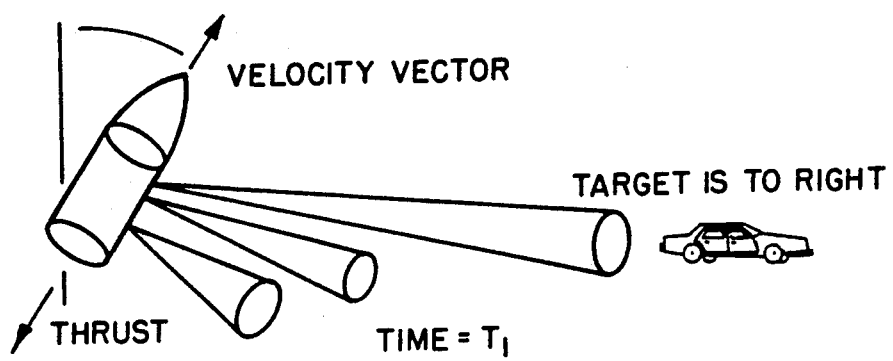
Figure 11C:
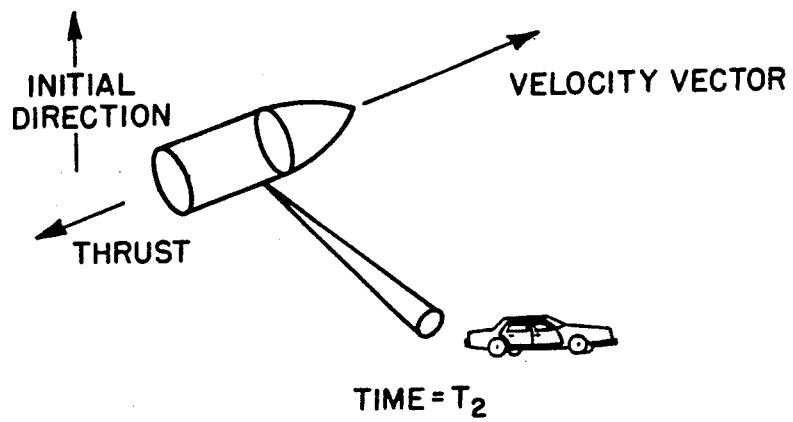
Figure 11D:
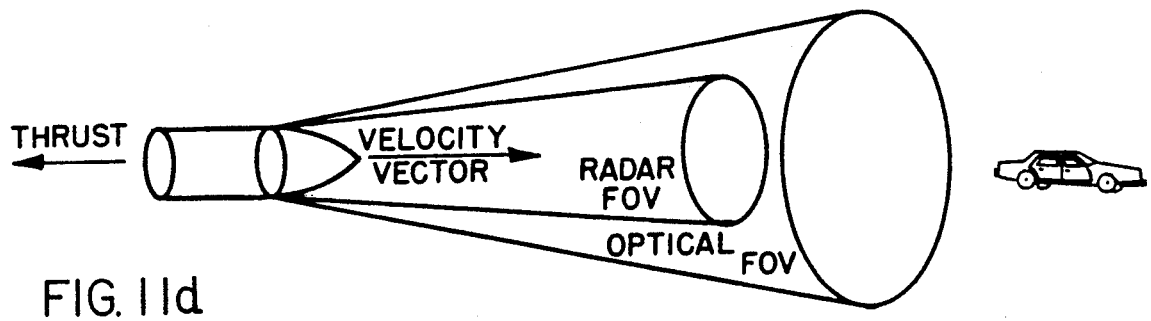

Turning now to FIGS. 11a thru 11d, there is shown a schematic representation of the target acquisition and final target lock-up sequence by a primary and secondary sensor system on a projectile. As shown in FIG. 11a, target acquisition is initially achieved by the primary system which was shown and described in FIG. 11. At time $T_0$, the target, in this example a car, is ninety degrees to the right of the projectile and the initial velocity vector of the projectile. The velocity vector and the thrust vector are clearly always 180° out of phase. In FIG. 11b, at time $T_1$, the projectile is displaced from its initial position as the projectile is launched toward the target. In FIG. 11c at time $T_2$, the projectile continues tracking the target with its secondary sensor system as it proceeds toward the target. In FIG. 11d, the projectile has locked-on to the target with its primary sensor system and is proceeding to the target.

Figure 12:
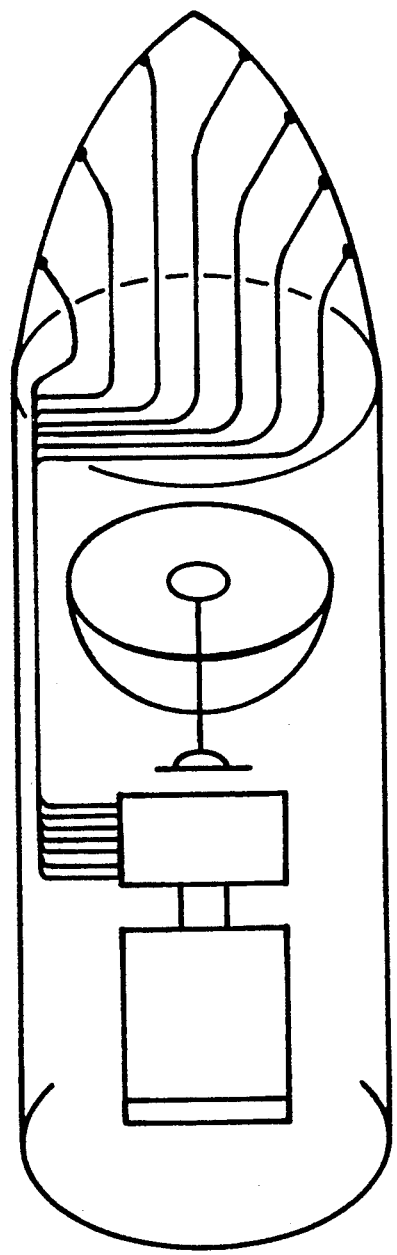
FIG. 12 is a schematic representation of a primary radar/optical sensor application for a projectile.

There is shown in FIG. 12 a schematic representation of a primary radar/optical sensor application for a projectile system. The optical portion of the primary radar/optical sensor system comprises the present optical sensor apparatus mounted in the nose cone of the projectile. The optical fibers which comprise part of the optical sensor apparatus as discussed herein are implanted or mounted in the nose cone or radome of the projectile. The radar system portion of the primary radar/optical sensor system may be positioned and mounted within the nose cone or radome of the projectile in any of the usual conventional ways. The signal processing units for both portions of the primary radar/optical sensor system may be contained within the projectile itself.

Although the invention has been described with reference to a particular embodiment, it will be understood to those skilled in the art that the invention is capable of a variety of alternative embodiments within the spirit and scope of the appended claims.

What is claimed is:

1. An optical sensor apparatus comprising in combination:
    an optical fiber having a front surface and a back surface, said optical fiber having a predetermined length and a core diameter, said front and back surfaces being cleaved and polished, said optical fiber receiving light signal at said front surface, said optical fiber conducting said light signal to said back surface,
    means for detecting light signals, said detecting means operatively aligned with said back surface of said optical fiber to directly receive said light signal therefrom, said detecting means having a center point and a larger diameter than said optical fiber, said optical fiber being aligned with the center point of said detecting means, said detecting means detecting said light signal and providing an output signal having a signal distribution in response thereto, and
    means for signal processing, said signal processing means operatively connected to said detecting means to receive said output signal from said detecting means, said signal processing means processing said output signal to determine the signal distribution of said output signal.

2. An optical sensor apparatus as described in claim 1 wherein said optical fiber has a core diameter in the range of one to three millimeters.

3. An optical sensor apparatus as described in claim 1 wherein said optical fiber has a core diameter of greater than one millimeter.

4. An optical sensor apparatus as described in claim 1 wherein said optical fiber has a numerical aperture of approximately 0.870 or smaller.

5. An optical sensor apparatus as described in claim 1 wherein said detecting means is responsive to infrared signals.

6. An optical sensor apparatus as described in claim 1 wherein said detecting means is responsive to ultraviolet signals.

7. An optical sensor apparatus as described in claim 1 wherein said detecting means is responsive to visible light signals.

8. An optical sensor apparatus as described in claim 1 wherein said optical fiber has a field of view of approximately ten degrees.

9. An optical sensor apparatus as described in claim 1 wherein said optical fiber has a field of view of less than ten degrees.

10. An optical sensor apparatus as described in claim 1 wherein said detector means comprises a CCD array.

11. An optical sensor apparatus as described in claim 1 wherein said optical fiber is attached directly to said detecting means.

12. An optical sensor apparatus as described in claim 1 wherein said back surface of optical fiber is directly attached to a means for mounting, said mounting means including a light transparent window, said back surface of said optical fiber is mounted flush with one side of said light transparent window.

13. An optical sensor apparatus as described in claim 1 wherein said output signal from said detecting means comprises a guassian signal distribution.

14. An optical sensor apparatus as described in claim 1 comprises a plurality of optical fibers in a hemispherical mounting structure to provide a means for surveillance which has a surveillance region of 2 pi steradians.

15. An optical sensor apparatus as described in claim 1 wherein said optical fiber has a core diameter of less than three millimeters.

16. An optical sensor apparatus as described in claim 1 wherein said optical fiber comprises a multi-mode optical fiber.

17. An optical sensor apparatus as described in claim 1 wherein said optical fiber and said detecting means are operatively connected to provide a non-imaging optic system.

18. An optical sensor apparatus as described in claim 2 wherein said optical fiber has a core diameter of approximately one millimeter.

* * * * *